(12) United States Patent
Sato et al.

(10) Patent No.: US 7,603,517 B2
(45) Date of Patent: Oct. 13, 2009

(54) DISK STORAGE DEVICE AND CACHE CONTROL METHOD FOR DISK STORAGE DEVICE

(75) Inventors: Noriyuki Sato, Kawasaki (JP); Hideaki Tanaka, Kawasaki (JP); Tatsuya Haga, Kawasaki (JP); Shigeru Shimizu, Kawasaki (JP); Takumi Kakuya, Kawasaki (JP); Yuichi Hirao, Kawasaki (JP); Masami Aihara, Kawasaki (JP); Hiroaki Murai, Kawasaki (JP); Masaki Obuchi, Kawasaki (JP); Mitsuhiko Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 719 days.

(21) Appl. No.: 11/236,420

(22) Filed: Sep. 27, 2005

(65) Prior Publication Data

US 2007/0070829 A1    Mar. 29, 2007

(51) Int. Cl.
*G06F 12/08* (2006.01)
*G06F 12/16* (2006.01)

(52) U.S. Cl. .................... 711/113; 710/52; 711/135

(58) Field of Classification Search ............ None
See application file for complete search history.

(56) References Cited

U.S. PATENT DOCUMENTS 7,130,962 B2 * 10/2006 Garney .................. 711/113
7,441,081 B2 * 10/2008 Humlicek .............. 711/113

FOREIGN PATENT DOCUMENTS

| JP | 6-348597 | 12/1994 |
| JP | 11-232037 | 8/1999 |

* cited by examiner

*Primary Examiner*—Gary J Portka
(74) *Attorney, Agent, or Firm*—Greer, Burns & Crain, Ltd.

(57) ABSTRACT

A disk storage device stores write data in a cache area of a data buffer according to a write command from a host, reports write completion to the host, and then writes the write data in the cache area to a storage medium. The disk storage device stores the write data stored in the data buffer in a save area created on the storage disk in response to the reception of a command which requires integrity, other than a write command, and reports a response to the host. Therefore processing time of this command and response time to the host can be decreased, while maintaining the safety of the write data.

14 Claims, 7 Drawing Sheets

DISK STORAGE DEVICE AND CACHE CONTROL METHOD FOR DISK STORAGE DEVICE

BACKGROUND OF THE INVENTION

1. Field of the Invention

The present invention relates to a disk storage device for recording data on a disk by a head, and a cache control method, and more particularly to a disk storage device for storing write data in a cache memory according to a write command and notifying the completion of the writing, and a cache control method.

2. Description of the Related Art

Due to the recent demand for data computerized processing, large capacity is demanded for medium storage devices of magnetic disk devices and optical disk devices for storing data. Therefore the track density and recording density of disk medium are increasing more and more. Also high-speed access is demanded. For this, when receiving a normal write command, the storage device stores write data in a cache memory and reports the completion to the host. Then the device writes the write data in the cache memory to a disk medium, that is, a write back is executed.

Figure 8:
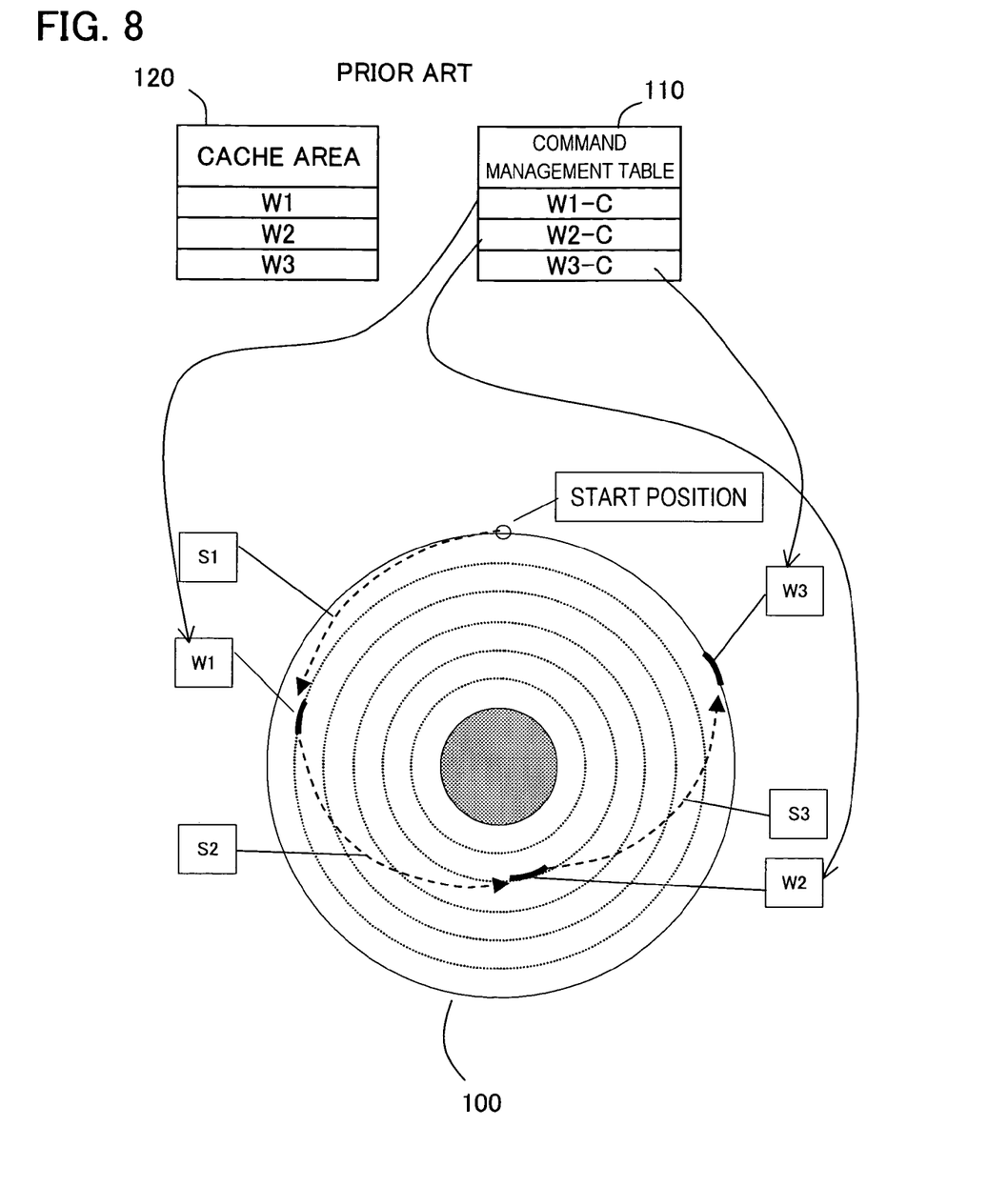
FIG. 8 is a diagram depicting a conventional write cache operation.

As FIG. 8 shows, to provide the write cache function, the disk storage device is provided a cache area 120 for storing data and a command management table 110 for storing the management data. When a write command and write data are received from the host, command management information, including the start LBA (Logical Block Address) acquired from the write command, the number of requested sectors, and the storage address in the cache area 120, is created and stored in the command management table 110. And the write data is stored in a specified storage address position of the command management table 110 in the cache area 120.

When no access comes from the host, the write data in this cache area 120 is written to the address (sector position) specified by the command management data in the command management table 110 of the disk 100.

On the other hand, installing a disk storage device on a personal computer and in such portable equipment as a portable music player is becoming popular. Therefore downsizing and lower price are demanded for the disk storage device. This makes it difficult to increase the capacity of the cache area. And this generates limitations in the number of commands and data volumes that can be written back.

As a method for virtually increasing the cache capacity, a method for writing a write command and write data exceeding the capacity of the cache memory in a secondary cache area created on the disk, returning a write completion to the host, and writing back the write data in the cache area, including the secondary cache area, in a specified position on the disk, has been proposed (e.g. Japanese patent Application Laid-Open No. H6-348597).

Another prior art that is proposed is as follows: if the write position of the write data in the cache area 120 is random, as shown in FIG. 8, the seek time and rotation wait time are generated since a plurality of write data W1, W2 and W3 are written. So it is judged whether the received write command is random, and if it is random write data, the data is not stored in the cache area 120, but is written to a save area created on the disk 100. And write completion is returned to the host, then the write data in the cache area 120, including the save area, is written back to specified portion on the disk 100 (e.g. Japanese Patent Application Laid-Open No. H11-232037).

These are methods to virtually expand the write cache area for a write command. Therefore if a command to forcibly write the write data in the write cache area 120 in the disk 100 is issued from the host for the safety of data, the above prior arts cannot be used.

Also if write cache data has already been held in the cache area 120 when such a command, other than a write command, is issued, the received command is executed after all of the write cache data is written to a specified position on the disk 100, as shown in FIG. 8, so the command response to the host device may delay.

SUMMARY OF THE INVENTION

With the foregoing in view, it is an object of the present invention to provide a disk storage device and cache control method for the disk storage device for preventing a delay in the response to the host, even if a command for data integrity, other than a write command, is received.

It is another object of the present invention to provide a disk storage device and a cache control method for the disk storage device for preventing a delay in the response to the host even if a command for data integrity, other than a write command, is received, and write data which requires a seek operation exists in plurality of locations in the cache area.

It is still another object of the present invention to provide a disk storage device and a cache control method for the disk storage device for preventing a delay in the response to the host by performing a virtual write cache operation on the disk, even if a command for integrity, other than a write command, is received.

It is still another object of the present invention to provide a disk storage device and a cache control method for the disk storage device for managing the write data with certainty even if a command for integrity, other than a write command, is received, and a virtual cache operation is executed on the disk.

To achieve the above objects, the disk storage device of the present invention has a head for either reading or writing data on a track of a storage disk, an actuator for positioning the head on a desired track of the storage disk, a data buffer for storing the write data from a host, and a control unit for storing the write data from the host to the data buffer according to a write command from the host, reporting the status to the host, and then writing the write data in the data buffer to the storage disk by the head. And the control unit stores the write data stored in the data buffer in a save area created on the storage disk in response to the reception of a command which requires data integrity, other than a write command, reports the response to the host, and then writes the write data stored in the save area on the storage disk in a specified position on the storage disk.

According to the present invention, it is preferable that the control unit stores command management information for specifying the write position of the write data from the host in the command management table, and stores the information in the save area along with the write data.

According to the present invention, it is preferable that the control unit stores the command management information of the command management table in a command management table for saving, in response to the reception of a command which requires data integrity, and stores the command management table for saving and the write data stored in the data buffer in the save area created on the storage disk.

Also according to the present invention, it is preferable that the control unit deletes the command management information stored in the command management table for saving from the command management table.

Also according to the present invention, it is preferable that the control unit judges whether two or more pieces of command management information are registered in the command management table, and if two or more pieces of command management information are registered, storage processing to the save area is executed.

According to the present invention, it is preferable that the control unit judges whether the command management information is registered in the command management table for saving, and, if the command management information is registered in the command management table for saving, reads the saved command management table for saving from the save area on the disk, registers the command management information of the command management table for saving in the command management table, and writes the write data stored in the save area on the storage disk to a specified position on the storage disk according to the command management information.

Also according to the present invention, it is preferable that the control unit deletes the command management information registered in the command management table from the command management table for saving.

Also according to the present invention, it is preferable that when one piece of command management information is registered in the command management table, the control unit writes the write data to a specified position on the storage disk according to the command management information.

Also according to the present invention, it is preferable that the control unit stores the write data stored in the data buffer in the save area created on the storage disk, in response to the reception of the Flush Cache command which requires data integrity, other than the write command, and reports a response to the host.

Also according to the present invention, it is preferable that the control unit stores the write data stored in the data buffer in the save area created on the storage disk in response to the reception of a power save command which requires data management, other than a write command, and reports a response to the host.

In the present invention, the write data stored in the data buffer is stored in the save area created on the storage disk in response to the reception of a command which requires data integrity, other than a write command, and a response is reported to the host, so processing time for this command decreases and response time to the host can be decreased. Also the format for saving is a plurality of commands (management data) and write data, so write back processing thereafter becomes easier.

DESCRIPTION OF THE PREFERRED EMBODIMENTS

Embodiments of the present invention will now be described in the sequence of disk storage device, write cache processing, cache data save processing, write back processing and other embodiments.

Disk Storage Device

Figure 1:
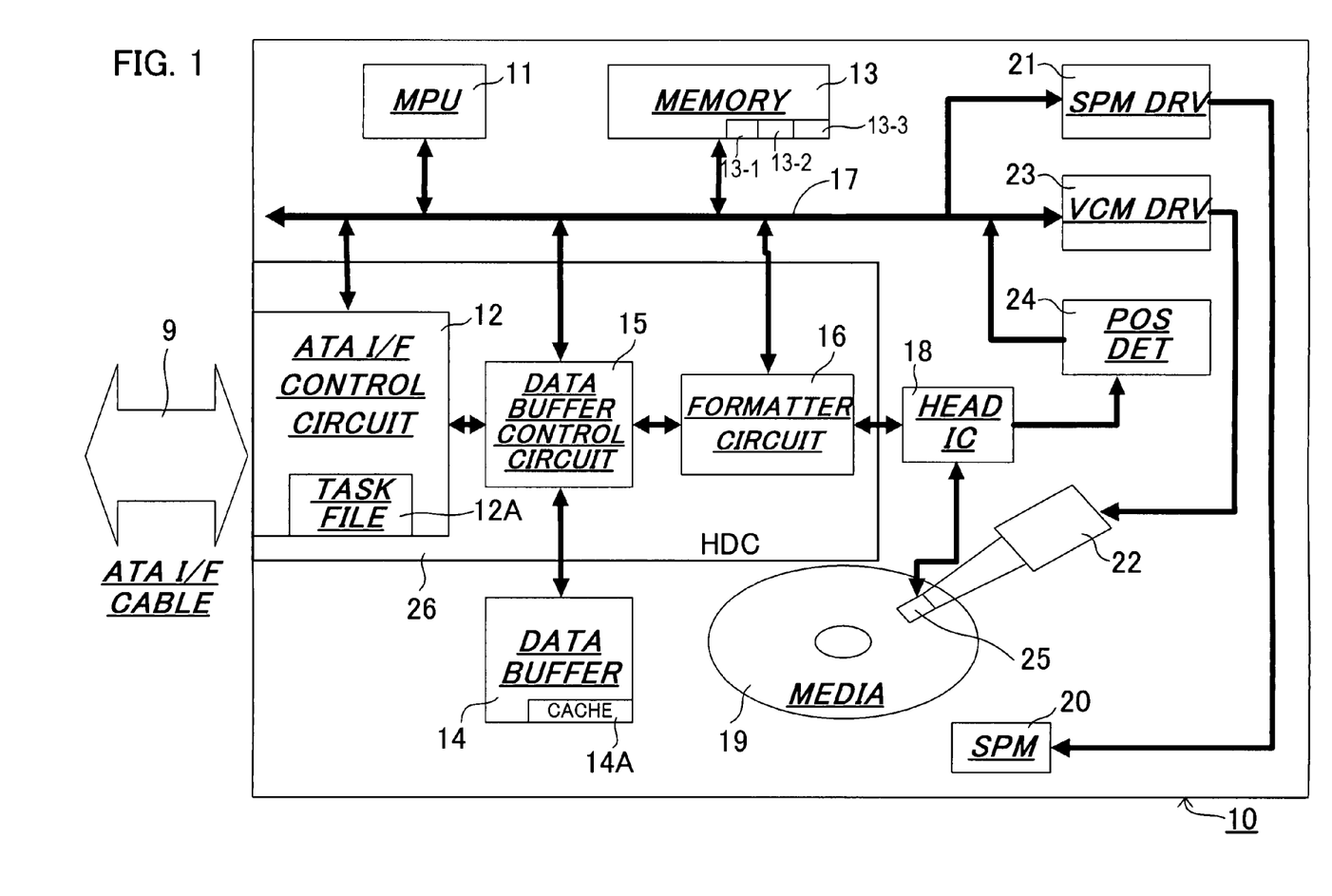
FIG. 1 is a block diagram depicting a disk storage device according to an embodiment of the present invention.
Figure 2:
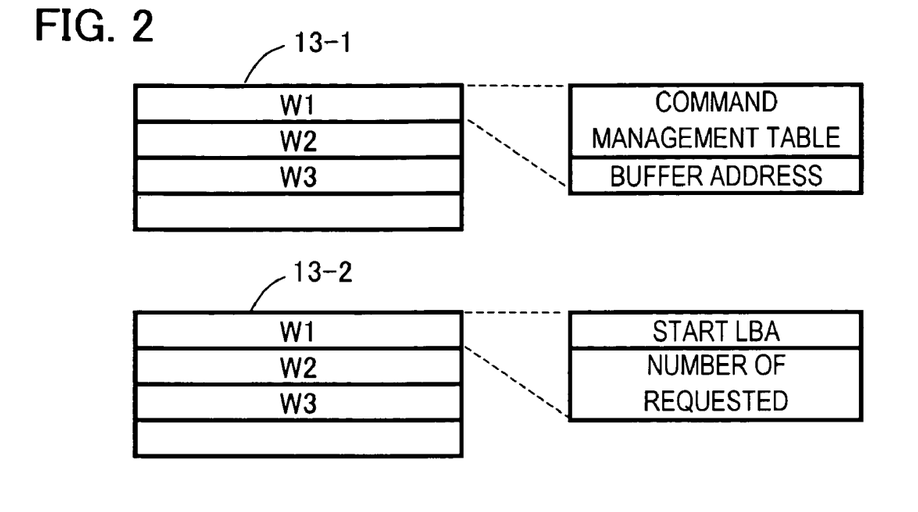
FIG. 2 is a diagram depicting the command management table and the cache data management table in FIG. 1.
Figure 3:
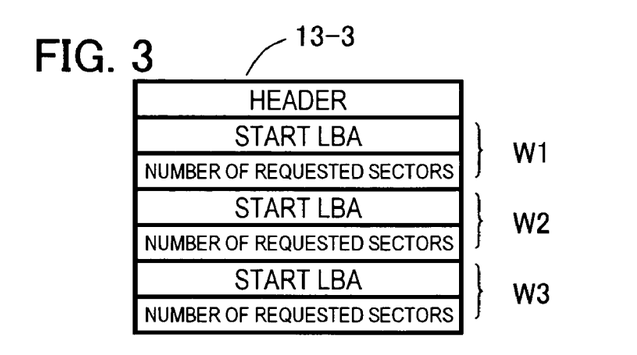
FIG. 3 is a diagram depicting the command management table for the save area in FIG. 1.

FIG. 1 is a block diagram depicting the disk storage device according to an embodiment of the present invention, FIG. 2 is a diagram depicting the command management table and the cache data management table in FIG. 1, and FIG. 3 is a diagram depicting the command management table for the save area in FIG. 1. FIG. 1 shows a magnetic disk device (Hard Disk Drive) for reading/writing data on the magnetic disk as an example of the disk storage device.

As FIG. 1 shows, the magnetic disk device 10 is built into a personal computer and is connected with the host (not illustrated) of the personal computer via the ATA (AT Attachment) standard interface cable 9.

The magnetic disk device 10 has a magnetic disk 19, a spindle motor 20 for rotating the magnetic disk 19, a magnetic head 25 for reading/writing data on the magnetic disk 19, and an actuator (Voice Coil Motor) 22 for moving the magnetic head 25 in the radius direction (track crossing direction) of the magnetic disk 19.

As a control section, the magnetic disk device 10 further has an HDC (Hard Disk Controller) 26, a data buffer 14, an MPU 11, a memory (RAM/ROM) 13, a head IC 18, a spindle motor driver 21, a VCM driver 23, a position detection circuit 24 and a bus 17 connecting these elements.

The HDC 26 further has an ATA interface control circuit 12 which has a task file 12A for setting a task from the host, a data buffer control circuit 15 for controlling the data buffer 14, and a formatter control circuit 16 for controlling the format of the recording data.

The data buffer 14 plays a role of the cache memory 14A, and stores the write data from the host and stores the read data from the magnetic disk 19. And when writing back, the write data in the data buffer 14 is written to the magnetic disk 19, and when reading, the read data in the data buffer 14 is transferred to the host.

The head IC 18 supplies the recording current to the magnetic head 25 according to the recording data when writing, and amplifies the read signal from the magnetic head 25 and outputs the read data (including the servo information) when reading. The position detection circuit 24 detects the position of the magnetic head 25 from the servo information from the head IC 18.

The spindle motor 21 drives the rotation of the spindle motor 20. The VCM driver 23 drives the VCM 22 for moving the magnetic head 25. The MPU (Micro Processor Unit) 11 performs position control, read/write control and retry control of the magnetic head 25. The memory (RAM/ROM) 13 stores data required for processing of the MPU 11. The memory 13 stores the command management table 13-1, cache data management table 13-2, and command management table for a save area 13-3 which will be described later in FIG. 2 and FIG. 3.

As FIG. 2 shows, the buffer management table 13-1 stores the buffer management data which is comprised of the command management table numbers of the write data W1, W2 and W3 stored in the cache memory 14A, and the storage (buffer) addresses thereof. The command management table 13-2 stores the write data management data, such as the start LBA (Logical Block Address) of the write data W1, W2 and W3 to be stored in the cache memory 14A, and the number of requested sectors.

As FIG. 3 shows, the command management table for save area 13-3 stores the write data management data (start LBA, number of requested sectors) of each write data stored in the command management table 13-2.

The magnetic head 25 in FIG. 1 is a head where the read element and the write element are separated, and the read element is an MR (Magneto-Resistive) element, and the write element is an inductive element having a magnetic core and coil.

Write Cache Processing

Figure 4:
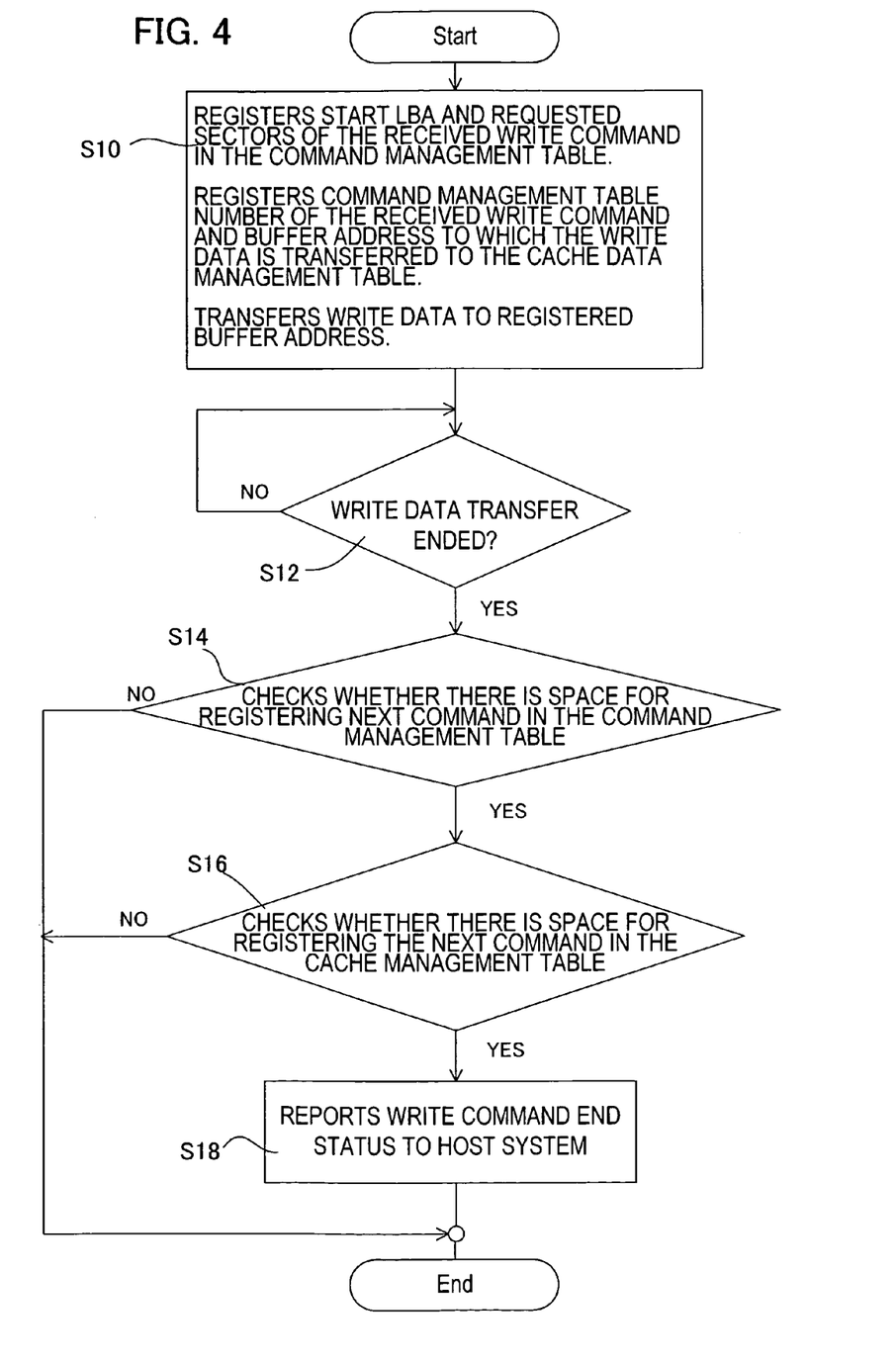
FIG. 4 is a flow chart depicting write cache processing according to an embodiment of the present invention.

FIG. 4 is a flow chart depicting the write cache processing according to an embodiment of the present invention.

(S10) When the host (not illustrated) issues a write request to the disk storage device 10, the write request is received by the ATA interface control circuit 12 of the HDC 26, and is notified to the MPU 11. The MPU 11 registers the start LBA and the number of requested sectors, included in the write command, in the command management table 13-2 for managing the received write command. And the MPU 11 stores the number of this registered command management table and the buffer address to be assigned in the data buffer in the cache data management table 13-1. Then the MPU 11 requests the host to transfer the write data, and when write data is received from the host, the data buffer control circuit 15 refers to this buffer management table 13-1, and transfers (writes) the write data to the registered buffer address in the data buffer 14.

(S12) Then the data buffer control circuit 15 judges whether the transfer of write data ended.

(S14) When the transfer of write data ends, the MPU 11 checks if there is a space to register the next command in the command management table 13-2. If there is no space, the processing ends, and busy is notified to the host.

(S16) If there is a space in the command management table 13-2, the MPU 11 checks whether the cache management table 13-1 has a space for registering the next command (that is an area for receiving data in the cache memory 14A). If there is no space, the processing ends, and busy is notified to the host.

(S18) If there is a space in the cache management table 13-1, the next command can be received, so the write command end status is reported to the host, and the processing ends.

Cache Data Save Processing

Figure 5:
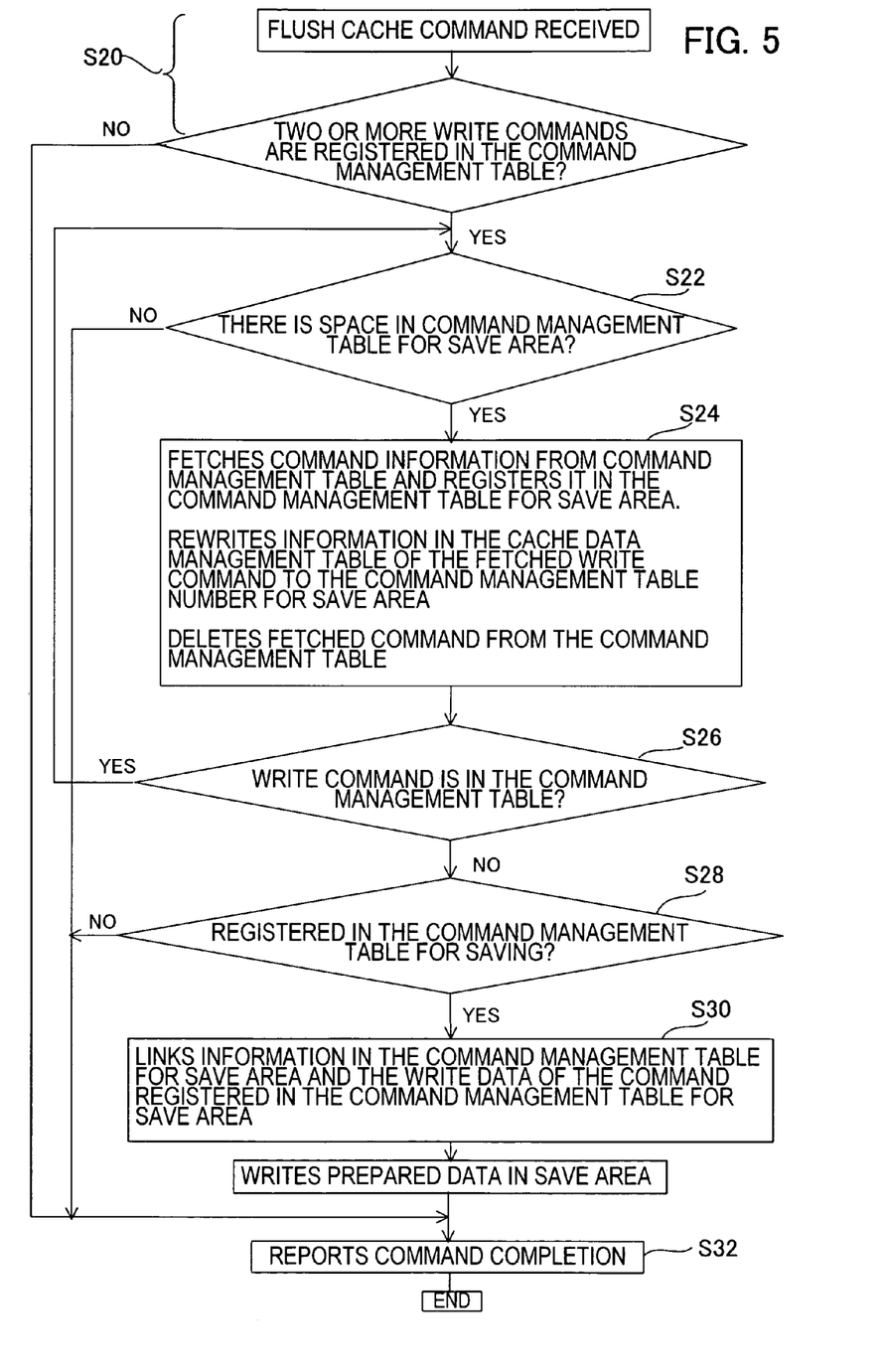
FIG. 5 is a flow chart depicting the cache data save processing when a command, other than a write command, is received according to an embodiment of the present invention.
Figure 6:
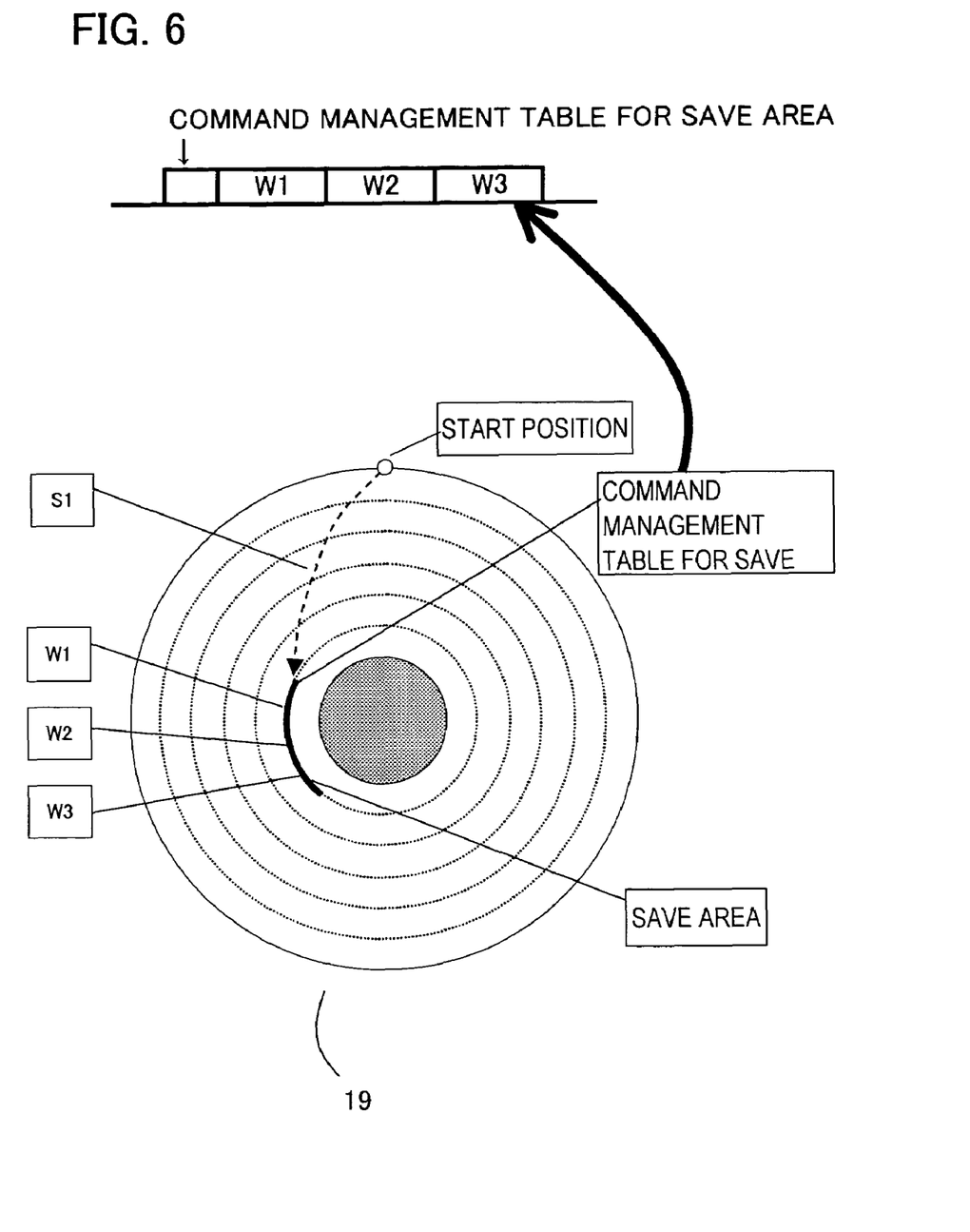
FIG. 6 is a diagram depicting the cache data save operation according to the processing in FIG. 5.

Now cache data save processing will be described. FIG. 5 is a flow chart depicting the cache data save processing according to an embodiment of the present invention, and FIG. 6 is a diagram depicting the operation thereof. In this example, the case when medium write processing is executed in the save area on the disk when the Flush Cache command is received in a status where a plurality of write commands (W1, W2, W3) have been received from the host, will be described. The Flush Cache command is a command that the host issues to the disk storage device for the purpose of data integrity when power is shut OFF or when entering resume mode.

(S20) When the ATA interface control circuit 12 of the HDC 26 received the Flush Cache command from the host, the MPU 11 judges whether there are any write commands (W1, S2, S3) stored in the command management table 13-2 (FIG. 2). If there are any write commands, the MPU 11 judges whether two or more write commands (write data management data) are registered in the command management table 13-2. If two or more pieces of write data management data are not registered, the processing advances to step S32 if the number of registered write data management data is "0", and if the number of registered write data management data is "1", this write data is written to a specified sector position to write the write data to one location, and the processing advances to step S32.

(S22) If two or more pieces of write data management data are registered, the MPU 11 checks the space of the command management table for save area 13-3 (FIG. 3). If there is no space, data can no longer be saved, so the processing advances to step S32.

(S24) If there is space in the command management table for save area 13-3, the MPU 11 fetches the write data management data from the command management table 13-2, and registers it in the command management table for save area 13-3. Also the MPU 11 rewrites the management number in the cache management table 13-1 to the number in the command management table for save area 13-3. Then the MPU 11 deletes the write data management data registered in the management table 13-3 from the command management table 13-2, and opens a space in the command management table.

(S26) The MPU 11 judges whether unregistered write data management data exists in the command management table 13-2. If unregistered write data management data exists in the command management table 13-2, the processing returns to step S22.

(S28) If unregistered write data management data does not exist in the command management table 13-2, the MPU 11 checks whether write data management data is registered in the command management table for save area 13-3 (FIG. 3). If not registered, the processing advances to step S32.

(S30) If write data management data is registered in the command management table for save area 13-3, the MPU 11 instructs the buffer control circuit 15 to continuously link the command management table for space area 13-3 and the data of the write command (W1, W2, W3 in FIG. 6) registered in the command management table for save area 13-3. On the other hand, as FIG. 6 shows, the save area is set outside the user area, such as an innermost area, on the magnetic disk 19. And the MPU 11 controls the actuator 22 to perform seek operation the magnetic head 25 in the save area of the magnetic disk 19, and has the magnetic head 25 continuously write the command management table for save area 13-3 (header, start LBA of W1, W2 and W3, and number of requested sectors in FIG. 3), and requested write data W1, requested write data W2 and requested write data W3.

(S32) And the MPU 11 reports the completion to the host via the HDC 26, and ends the processing of the Flush Cache command.

Conventionally, as FIG. 8 shows, the write cache management data is fetched from the beginning of the command management table 110, seek operation is performed for the start LBA (S1 in FIG. 8), and write processing for the number of requested sectors (W1 in FIG. 8) is started. After the write operation of the write data W1 for the number of sectors completes, the next write cache management data is fetched from the command management table 110, seek operation is performed for the start LBA (S2 in FIG. 8), and write processing for the number of requested sectors (W2 in FIG. 8) is started. After write operation for the number of requested sectors of this write data W2 completes, the next write cache management data is fetched from the command management table 110, seek operation is performed for the start LBA (S3 in FIG. 8), and write processing for the requested sectors (W3 in FIG. 8) is started. After writing all the write cache data to the medium 19, command completion status is reported to the host.

In this way if prior art is used and write-cache is performed for the write data W1, W2 and W3, seek processing (S1, S2 and S3 in FIG. 8) is requested in the write processing of each command, and the processing time of the Flush Cache command becomes long.

Whereas in the case of the present invention, if two or more write commands are registered in the command management table 13-2 when a Flush Cache command is received, as shown in FIG. 6, the write commands (W1, W2, W3) are sequentially fetched and registered in the command management table for save area 13-3 such that the plurality of commands are registered at one place. At this time, the write commands to be saved are deleted from the command management table 13-2, and a space in the command management table is opened.

And the registration data in the command management table for save area 13-3 and data of the write commands registered in the command management table for save area 13-3 are linked so as to be written continuously. The seek operation is performed for the save area on the magnetic disk 19, and the linked command management table for save area, and requested write data W1, requested write data W2 and requested write data W3 are written continuously.

Therefore the processing time for this command is decreased, and the response time to the host can be decreased. Also the format for saving is a plurality of commands (management data) and the write data, so write back processing thereafter becomes easier.

Write Back Processing

Figure 7:
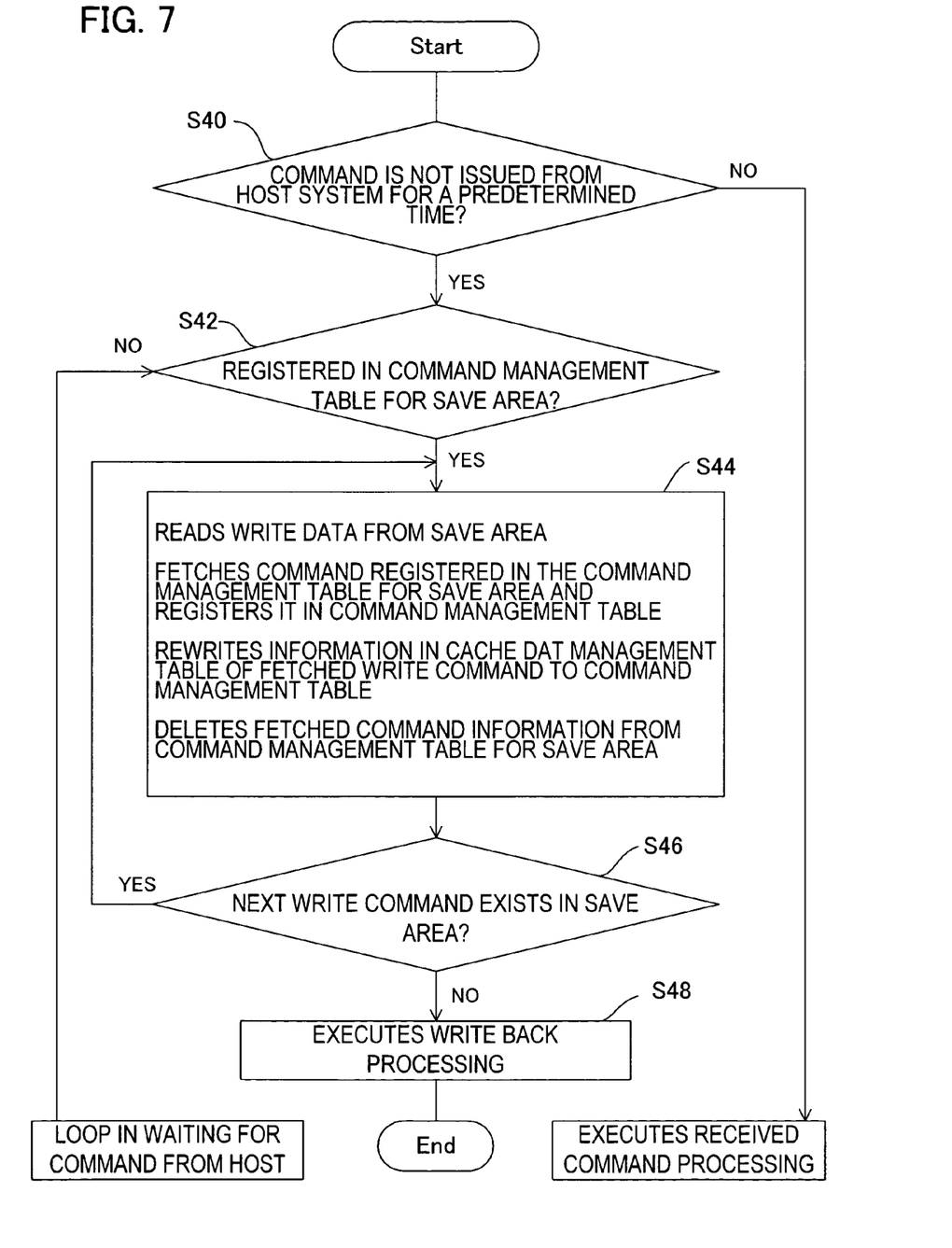
FIG. 7 is a flow chart depicting the write back processing according to an embodiment of the present invention.

Now the write back processing will be described with reference to FIG. 7.

(S40) The MPU 11 judges whether the host issued a command for a predetermined time. If the host issued a command, the MPU 11 executes the processing of the received command.

(S42) If it is judged that the host did not issue a command for a predetermined time, on the other hand, the MPU 11 checks whether the write data management data is registered in the management table for save area 13-3 since there is time. If the write data management data is not registered, this means that no data is saved in the save area, so the processing returns to a loop to wait for a command from the host.

(S44) If the write data management data is registered in the management table for save area 13-3, which means that the data is saved in the save area, the MPU 11 controls the actuator 25, positions the magnetic head 25 to the save area of the magnetic disk 19 (see FIG. 6), and reads the data written in the save area. The MPU 11 checks that the command is one registered in the command management table for save area 13-3 from the read data, and sequentially registers the data in the command management table 13-2. And the MPU 11 rewrites the information to the cache management table 13-1 to the number in the command management table 13-2, and deletes the write command from the command management table for save area 13-3.

(S46) The MPU 11 judges whether the next write command exists from the read data in the save area, and if it exists, the processing returns to step S44.

(S48) If the next write command does not exist, the MPU 11 writes the write data in a specified position on the magnetic disk 19 according to the write command registered in the command management table 13-2. In other words, the MPU 11 drives the VCM 22 via the VCM driver 23, and seeks (track change, head change) up to a predetermined position (track) on the medium 19. The write data read from the save area in step S44 has been stored again in the buffer memory 14, so the MPU 11 instructs the HDC 26 to write to the medium, and the HDC 26 sends the write data of the buffer memory 14 to the magnetic head 25 (write element) via the head IC 18, and executes write back. If the data extends over a plurality of tracks, medium write is performed to the current track position.

In this way, the write data management data of the write cache and write data are sequentially written to the save area on the magnetic disk 19, and the command is completed, and in idle time when a command is not received from the host for a predetermined time, write data can be written to the specified positions on the magnetic disk 19 at random.

Other Embodiments

In the above embodiments, the disk storage device was described using a magnetic disk device, but the present invention can also be applied to an optical disk, magneto-optical disk and other storage medium. The interface is not limited to ATA, but can be applied to other interfaces. The command for the safety of data was described using the Flush Cache command, but can also be applied to other commands which require the safety of cache data, such as a power save command.

Also in step S24 in FIG. 5, a command in the command management table 13-2 is deleted when it is registered in the management table for saving 13-3, but the command need not be deleted. The memory 13 is created in management tables 13-1, 13-2 and 13-3, but this may be created in the buffer memory 14.

The present invention was described by the embodiments, but the present invention can be modified in various ways within the scope of the essential character of the present invention, and these shall not be excluded from the scope of the present invention.

What is claimed is:

1. A disk storage device, comprising:
   a head for either reading or writing data on a track of a storage disk;
   an actuator for positioning said head on a desired track of said storage disk;
   a data buffer for storing write data from a host;
   a command management table for storing command management information which specifies a write position of the write data; and
   a control unit for storing the write data from said host to said data buffer according to a write command from said host, reporting the status to said host, and then writing said write data in said data buffer on said specified write position in said storage disk by said head,
   wherein said control unit judges whether two or more pieces of command management information are registered in said command management table, in response to the reception of a command which requires data integrity, other than said write command, stores said write data stored in said data buffer and said command management table onto a save area created on said storage disk when judging that two or more pieces of command management information are registered, reports a response to said host, and then writes said write data stored in the save area on said storage disk in said specified position on said storage disk,
   and wherein said control unit reports the status to said host, and then writes said write data in said data buffer on said specified write position in said storage disk by said head when judging that only one piece of command management information are registered.

2. The disk storage device according to claim 1, wherein said control unit stores the command management information of said command management table in a command management table for saving, in response to the reception of a command which requires said data integrity, and stores said command management table for saving and said write data stored in said data buffer in the save area created on said storage disk.

3. The disk storage device according to claim 2, wherein said control unit deletes said command management information stored in said command management table for saving from said command management table.

4. The disk storage device according to claim 2, wherein said control unit judges whether said command management information is registered in said command management table for saving, and, when judging that said command management information is registered in said command management table for saving, reads said saved command management table for saving from said save area on said disk, registers said command management information of said command management table for saving in said command management table, and writes said write data stored in the save area on said storage disk in a specified position on said storage disk according to said command management information.

5. The disk storage device according to claim 4, wherein said control unit deletes said command management information registered in said command management table from said command management table for saving.

6. The disk storage device according to claim 1, wherein said control unit stores said write data stored in said data buffer in the save area created on said storage disk in response to the reception of a Flush Cache command which requires data integrity, other than said write command, and reports a response to said host.

7. The disk storage device according to claim 1, wherein said control unit stores said write data stored in said data buffer in the save area created on said storage disk in response to the reception of a power save command which requires data integrity, other than said write command, and reports a response to said host.

8. A cache control method for a disk storage device for either reading or writing data on a track of a storage disk by a head, comprising the steps of:
 storing write data from a host in a data buffer and command management information for specifying a write position of the write data from said host in a command management table according to a write command from said host, and returning a response to said host;
 judging whether two or more pieces of command management information are registered in said command management table in response to the reception of a command which requires data integrity, other than said write command;
 storing said write data stored in said data buffer and said command management table onto a save area created on said storage disk in response to the reception of a command which requires data integrity, other than said write command, and reporting a response to said host and writing said write data stored in the save area on said storage disk in said specified position on said storage disk when two or more pieces of command management information are registered; and
 writing said write data in said specified position on said storage disk according to said command management information when one piece of command management information is registered in said command management table.

9. The cache control method for a disk storage device according to claim 8, wherein said reporting step further comprises:
 a step of storing the command management information in said command management table in a command management table for saving, in response to the reception of a command which requires said data integrity; and
 a step of storing said command management table for saving and said write data stored in said data buffer in the save area created on said storage disk.

10. The cache control method for a disk storage device according to claim 9, further comprising a step of deleting said command management information stored in said command management table for saving from said command management table.

11. The cache control method for a disk storage device according to claim 9, wherein said writing step further comprises:
 a step of judging whether said command management information is registered in said command management table for saving;
 a step of reading said saved command management table for saving from said save area on said disk when said command management information is registered in said command management table for saving, and registering said command management information of said command management table for saving in said command management table; and
 a step of writing said write data stored in the save area on said storage disk in a specified position on said storage disk according to said command management information.

12. The cache control method for a disk storage device according to claim 11, further comprising a step of deleting said command management information registered in said command management table from said command management table for saving.

13. The cache control method for a disk storage device according to claim 8, wherein said reporting step further comprises:
 a step of storing said write data stored in said data buffer in the save area created on said storage disk in response to the reception of a Flush Cache command which requires data integrity, other than said write command; and
 a step of reporting a response to said host.

14. The cache control method for a disk storage device according to claim 8, wherein said reporting step further comprises:
 a step of storing said write data stored in said data buffer in the save area created on said storage disk in response to the reception of a power save command which requires data integrity, other than said write command; and
 a step of reporting a response to said host.

* * * * *